(12) United States Patent
Close et al.

(10) Patent No.: US 8,050,420 B2
(45) Date of Patent: Nov. 1, 2011

(54) INTEGRATED VEHICLE SEAT AND SPEAKER ASSEMBLY

(75) Inventors: Richard A. Close, Farmington Hills, MI (US); Matthew R. Kirsch, Shelby Township, MI (US); Frank A. Mills, Brighton, MI (US); Rainer A. Glaser, Washington, MI (US); James B. Milnar, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 945 days.

(21) Appl. No.: 12/023,551

(22) Filed: Jan. 31, 2008

(65) Prior Publication Data

US 2009/0196432 A1 Aug. 6, 2009

(51) Int. Cl.
*H04B 1/00* (2006.01)
*H04R 1/02* (2006.01)
(52) U.S. Cl. ............. 381/87; 381/86; 381/332; 381/333
(58) Field of Classification Search .................. 381/332, 381/87, 86, 333
See application file for complete search history.

(56) References Cited

U.S. PATENT DOCUMENTS

| 7,130,440 | B2* | 10/2006 | Maekawa et al. ............. 381/389 |
| 7,255,399 | B2* | 8/2007 | White et al. ............. 297/378.12 |
| 2004/0105567 | A1* | 6/2004 | Kurihara et al. ............. 381/386 |
| 2005/0035641 | A1* | 2/2005 | Petersen ....................... 297/396 |
| 2005/0062304 | A1* | 3/2005 | Murray et al. ............. 296/24.42 |
| 2007/0210638 | A1* | 9/2007 | Adragna et al. ........... 297/452.2 |

* cited by examiner

*Primary Examiner* — Anh Mai
(74) *Attorney, Agent, or Firm* — Quinn Law Group, PLLC

(57) ABSTRACT

An integrated seat speaker includes a cushion, a seat frame defining a first internal air volume, and a speaker enclosure defining a second internal air volume. The second internal air volume is acoustically coupled to the first internal air volume through an air passageway, thus producing a continuous acoustical air volume. An acoustic sealing member is disposed between the enclosure and the frame. The frame includes a closure feature at one end for isolating a portion of the first internal air volume. The cushion includes an outer surface, and the speaker enclosure is enclosed within the seat cushion and at least partially concealed by the outer surface. A method optimizes the acoustical performance of a speaker assembly by acoustically coupling an internal air volume defined by a speaker enclosure to another internal air volume defined by a seat frame to create a continuous acoustical air volume.

13 Claims, 1 Drawing Sheet

_US 8,050,420 B2_

INTEGRATED VEHICLE SEAT AND SPEAKER ASSEMBLY

TECHNICAL FIELD

The present invention relates generally to an audio speaker assembly that is usable in conjunction with a vehicle seat, and in particular to an audio speaker having an enclosure that is acoustically coupled to a hollow frame portion of the vehicle seat, thus minimizing the size and optimizing the audio performance of the audio speaker.

BACKGROUND OF THE INVENTION

Audio speakers or speaker assemblies are used within vehicle interiors for converting an electronic sound signal from a sound system, such as a radio, MP-3 player, compact disc (CD) and/or digital video disc (DVD) player, etc., into an audible sound wave. Speaker assemblies typically include a diaphragm that vibrates in response to the sound signal, with the vibration of the diaphragm moving the air particles surrounding the speaker assembly to thereby create the audible sound wave. The pulse of the vibration or sound wave is then propagated through the air within the vehicle interior.

In order to produce an acceptable sound quality from speaker assemblies that are attached to a vehicle seat, the speaker assembly may include an enclosure having an acoustic chamber having a sufficient amount of captive air volume. Ordinarily, speaker assemblies mounted to or within a vehicle seat are installed in or attached to a horizontal portion of the seat back or to the head restraint. However, such designs may be less than optimal due to various design and/or size constraints presented by the limited size of the head restraint, and/or by any available seat back surface area having a horizontal plane at the top of the seat.

SUMMARY OF THE INVENTION

Accordingly, a seat assembly is provided for use within a vehicle interior. The seat assembly includes a speaker assembly that is acoustically coupled with an otherwise dead space or unutilized captive air volume contained within a seat frame. By acoustically coupling the air volume of the seat frame with an air volume of the speaker assembly, a smaller speaker assembly may be constructed having an optimized acoustic performance.

In one aspect of the invention, the seat assembly includes a seat cushion, a hollow seat frame configured for supporting the seat cushion and defining a first internal air volume, and a speaker assembly defining a second internal air volume. The speaker assembly is connected to the seat frame such that the second internal air volume is acoustically coupled to the first internal air volume through an air passageway, thus producing a continuous acoustical air volume shared by the speaker assembly and the seat frame.

In another aspect of the invention, the seat frame is constructed of tubular or stamped steel.

In another aspect of the invention, the seat assembly includes an acoustic sealing member disposed between the speaker assembly and the seat frame for acoustically sealing the air passageway.

In another aspect of the invention, the seat frame of the seat assembly includes a closure feature at one end that isolates a predetermined portion of the first internal air volume.

In another aspect of the invention, the closure feature is a crimp, a sealing device, or a plug.

In another aspect of the invention, the seat cushion has an outer surface, and the speaker assembly is enclosed within the seat cushion and at least partially concealed by the outer surface.

In another aspect of the invention, the continuous acoustical air volume is approximately 0.3 to 0.4 liters.

In another aspect of the invention, the vehicle has an audio device, a seat having a cushion portion, a hollow seat frame configured for supporting the cushion portion and defining a first internal air volume, and a speaker assembly. The speaker assembly converts an audio signal from the audio device into an audible sound wave, and has an enclosure defining a second internal air volume. The speaker assembly is connected to the hollow seat frame, and the second internal air volume is acoustically coupled to the first internal air volume through an air passageway for producing a continuous acoustic air volume, thus optimizing an acoustic performance of the speaker assembly.

In another aspect of the invention, the vehicle includes a first and a second speaker assembly, and the hollow seat frame further defines a third internal volume positioned opposite the first internal volume. The third internal volume is acoustically coupled to the second internal volume of the second speaker assembly and is isolated from the first internal volume for optimizing an acoustic performance of the second speaker assembly.

In another aspect of the invention, a method is provided for optimizing the acoustical performance of a speaker assembly used with a vehicle seat having a hollow frame portion. The method includes acoustically coupling an internal air volume defined by a speaker enclosure of the speaker assembly to another internal air volume defined by the hollow frame portion to thereby create a continuous acoustical air volume usable by the speaker assembly.

In another aspect of the invention, the method includes closing the hollow frame portion at one end to isolate a predetermined portion of the continuous acoustical air volume.

In another aspect of the invention, the method includes positioning an acoustical sealing gasket at least partially between the hollow frame portion and the speaker enclosure.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
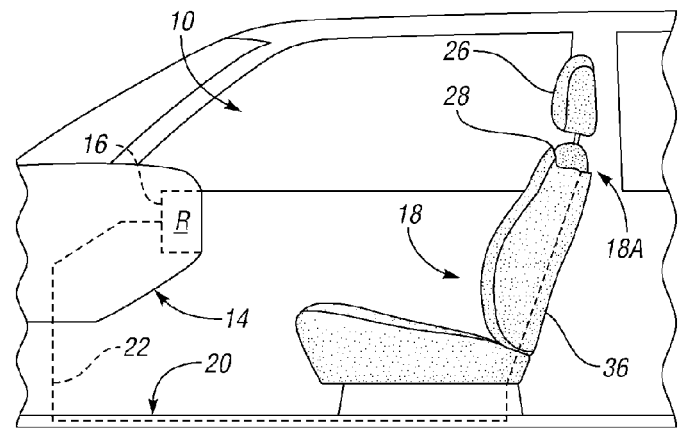
FIG. 1 is a schematic partial side view of a vehicle interior having an integrated speaker assembly and seat according to the invention.

Referring to the drawings, wherein like reference numbers correspond to like or similar components throughout the several figures, and beginning with FIG. 1, a vehicle interior 10 includes a seat assembly 18 that is adapted for conveying an occupant (not shown). The seat assembly 18 may include an adjustable head restraint or headrest 26, with the seat assembly 18 being adjustably mounted to a floor panel or floor 20 of the vehicle interior 10, and oriented facing an instrument panel 14 as shown. The seat assembly 18 includes a seat cushion 18A that is supported by seat frame portions 36R, 36L (see FIG. 2), which are indicated generally in FIG. 1 at 36. The seat cushion 18A may be upholstered in any suitable manner, i.e., with natural leather and/or synthetic materials such as a fabric or textile, in accordance with the desired design of the vehicle interior 10.

The instrument panel 14 contains or houses various instruments, control devices, storage compartments, air conditioning/heating vents, clocks, etc., and also houses at least one audio device 16. The audio device 16 may include, but is not limited to, a radio, cassette, CD and/or DVD player, an MP-3 player, an audio receiver, an audio amplifier, and/or other such audio devices. The audio device 16 is in electrical communication with an integrated speaker assembly 28 of the invention via a speaker wire 22, and/or via a wireless or RF communication link.

Figure 2:
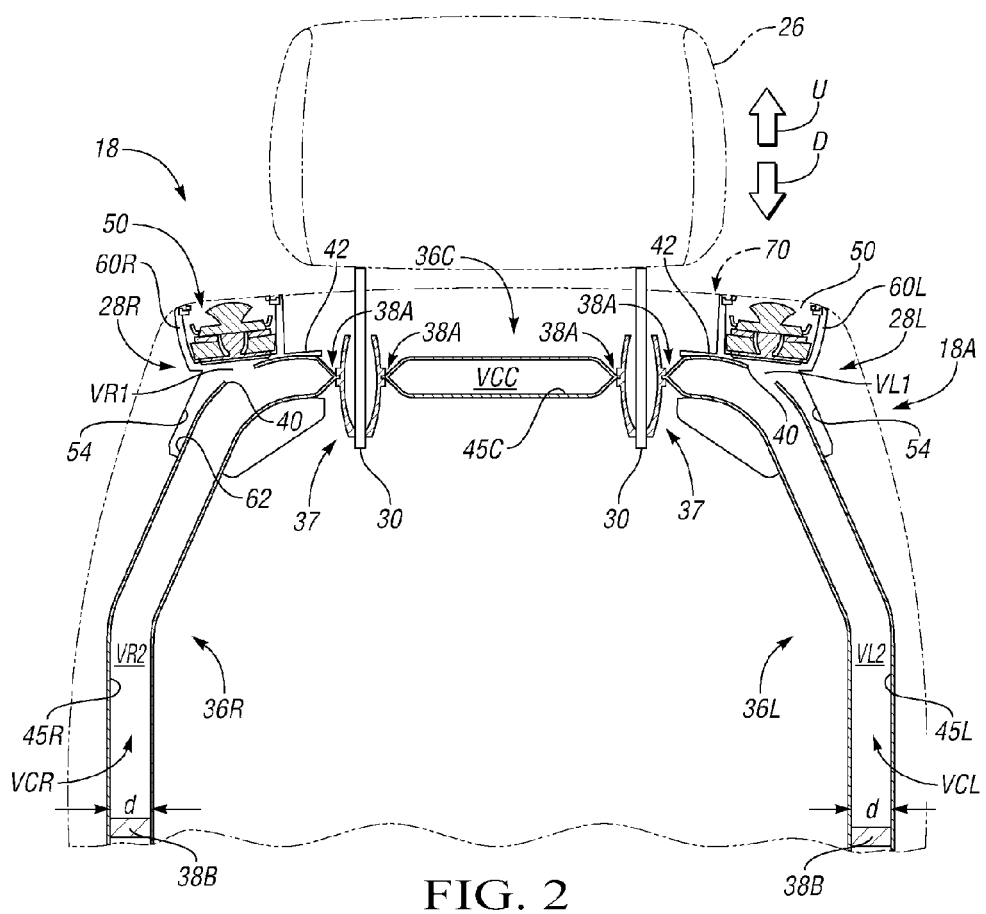
FIG. 2 is a schematic partial cross-sectional front view of the integrated speaker assembly and seat shown in FIG. 1.

Referring to FIG. 2, the integrated speaker assembly 28 of FIG. 1 is shown as a pair of integrated speaker assemblies 28R and 28L, with the suffixes R and L respectively referring to the right-hand (R) and the left-hand (L) positions of the seat assembly 18 with respect to an occupant (not shown) seated thereon. As used herein, the term "integrated" refers to the acoustic coupling of the integrated speaker assemblies 28R, 28L with the seat frame 36 (see FIG. 1) as described below. While two integrated speaker assemblies 28R, 28L are shown and described herein, within the scope of the invention additional speaker assemblies 28 or just one speaker assembly 28 may be used as desired in order to provide the desired sound quality within the vehicle interior 10 (see FIG. 1), and/or to create a particular surround-sound effect therein. However many integrated speaker assemblies 28 are used, each integrated speaker assembly 28 is acoustically isolated from every other integrated speaker assembly 28, as will be described below.

As shown in FIG. 2, the headrest 26 is presented in a partially-extended position with respect to the seat cushion 18A, and may be selectively raised and lowered in the directions of arrows D and U as desired, such as by using a button or lever (not shown). The seat assembly 18 is supported by various seat frame portions 36R and 36L, with an optional seat frame portion 36C being a relatively short length or section of the seat frame 36 (see FIG. 1) that is disposed between a pair of head rest guides or support members 37, with each of the support members 37 containing a height-adjustment rod 30 extending from the head rest 26. The seat frame portions 36R, 36L are hollow, and may be constructed of tubular steel, stamped steel, or another similarly rigid material having a desired cross-sectional shape, such as a circular, square, or a rectangular cross-sectional shape.

The seat frame portions 36R, 36L each have a respective interior wall 45R, 45L at least partially defining a respective and acoustically isolated combined chamber, cavity, or volume VCR and VCL. The combined air volumes VCR and VCL each define a continuous air volume formed by coupling an enclosure air volume VR1 and VL1 each defined by an enclosure wall 54 of the speaker enclosures 60R, 60L, with a respective seat frame air volume VR2 and VL2 of each of the respective seat frame portions 36R, 36L. Each of the enclosure air volumes VR1 and VR2 is separately defined by a different one of the speaker enclosures 60R, 60L. Likewise, in the embodiment shown in FIG. 2 a seat frame portion 36C disposed between the seat frame portions 36R, 36L also has an interior wall 45C defining a center air chamber, cavity, or volume VCC that is suitably positioned between the combined air chambers VCL and VCR for further acoustically isolating the combined air chambers VCL and VCR from one another.

Each of the integrated speaker assemblies 28R, 28L include a number of interconnected speaker internals 50, i.e. all of the necessary components for converting a signal from the audio device 16 (see FIG. 1) to an audible sound wave. The integrated speaker assemblies 28R, 28L and the speaker internals 50 may be positioned under or behind one or more layers of upholstery 70 of the seat assembly 18 to provide an aesthetically finished or trimmed appearance.

Although not shown in detail in FIG. 2, the speaker internals 50 may include a moveable paper, plastic, and/or metal cone or diaphragm that is retained by a rim or surround portion and connected to a frame or basket, a spider, an electromagnet, a permanent magnet, various electrical wires or coils, a dust cap, etc., as such terms will be understood by those of ordinary skill in the art. The speaker internals 50 are housed or contained within a portion of the speaker enclosure 60R, 60L. Each speaker enclosure 60R, 60L thus defines a respective enclosure air volume VR1, VL1, with each of the speaker enclosures 60R, 60L each being bolted, welded, riveted, or otherwise fastened to the seat frame portion 36R during manufacturing of the seat assembly 18.

Within the seat frame portion 36R, 36L, the respective seat frame air volume VR2, VL2 of the respective seat frame portions 36R, 36L are each acoustically coupled with a respective enclosure air volume VR1, VL1 of a speaker enclosure 60R, 60L through an opening or air passageway 40. In this manner, a continuous acoustical air volume or a specific air volume is formed that is shared by the integrated speaker assembly 28R, 28L and the respective seat frame portion 36R, 36L to which the integrated speaker assembly 28R, 28L is attached or integrated. The continuous acoustical air volume or specific air volumes are abbreviated herein for simplicity as VCR and VCL, with VCR=VR1+VR2 and VCL=VL1+VL2.

Each of the continuous acoustic air volumes or specific air volumes VCR and VCL are preferably at least approximately 0.3 liters (L), but may be any larger or smaller volume within the scope of the invention. An acoustic sealing member 42, such as a gasket, expanded foam, or a seal having a suitable acoustical sealing or isolation properties, may be positioned between the speaker enclosure 60R, 60L and the outer surface 62 of the seat frame portion 36R, 36L, respectively, to minimize or prevent air leakage from the continuous acoustic air volumes or specific air volumes VCR, VCL, and/or to prevent propagation of any undesired vibration component that may emanate from the integrated speaker assembly 28R, 28L to the respective seat frame portion 36R, 36L to which it is attached or integrated.

Each integrated speaker assembly 28R, 28L, or other additional integrated speaker assemblies that might be used within the seat assembly 18, each have an enclosure air volume V1 that is acoustically isolated from that of the other speaker assembly 28R, 28L used within the same seat assembly 18, and from any additional speaker assemblies 28 (see FIG. 1) used within the seat assembly 18. Within the scope of the invention, the specific air volumes or continuous acoustic air volumes VS1 and VS2 may be selected or varied using closure features such as a crimp feature 38A and/or a cap or plug feature 38B, each of which act to acoustically seal and/or isolate the various air chambers C1, C2, and C3 from one another.

For example, in the embodiment shown in FIG. 2, the specific or continuous acoustic air volume VCL is isolated or separated from the specific or continuous air volume VCR in part by the intervening closed air chamber VCC, which may be left unfilled or empty in order to form a dead air volume as shown, or packed or filled with a suitable acoustical damping or sealing material to further isolate continuous air volume VCR from the continuous air volume VCL. However, those of ordinary skill in the art will recognize that other features may be used to isolate the continuous acoustic air volumes VCL and VCR from each other, such as a plug feature 38B or a crimp feature 38A.

Likewise, those of ordinary skill in the art will recognize that the seat frame portions 36R, 36L may be left open at one end, provided that the continuous acoustic air volumes VCR and VCL of the respective seat frame portions 36R, 36L are not acoustically coupled to each other elsewhere within the seat assembly 18. Finally, the overall length of the seat frame portion 36R, 36L, and/or the location of the crimp feature 38A, and/or the location of the plug features 38B within the seat frame portions 36R, 36L may be used to selectively change or "tune" the specific air volumes or continuous acoustic volumes VCR, VCL for optimum acoustic performance of the speaker assemblies 28R, 28L during manufacturing of the seat assembly 18 and the vehicle interior 10 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A seat assembly comprising:
   a cushion;
   a hollow frame configured for supporting the cushion, wherein the hollow frame includes a wall which defines an air passageway and an internal air volume, and wherein the hollow frame has a closed end; and
   at least one speaker assembly having an enclosure defining another internal air volume;
   wherein:
      the at least one speaker assembly is connected to the hollow frame adjacent to the closed end of the hollow frame; and
      the internal air volume of the enclosure is acoustically coupled to the internal air volume of the hollow frame via the air passageway for producing a continuous acoustical air volume.

2. The seat assembly of claim 1, wherein the hollow frame is constructed at least partially of one of tubular steel and stamped steel.

3. The seat assembly of claim 1, further comprising an acoustic sealing member disposed between the at least one speaker assembly and the hollow frame, wherein the acoustic sealing member is adapted for acoustically sealing the air passageway.

4. The seat assembly of claim 1, wherein the continuous acoustical air volume is approximately 0.3 to 0.4 liters.

5. The seat assembly of claim 1, wherein the seat assembly includes a closure feature configured for providing the closed end, and which is selected from the group consisting essentially of a crimp feature, a sealing device, and a plug feature.

6. The seat assembly of claim 1, wherein the cushion includes an outer surface, and wherein the at least one speaker assembly is enclosed within the cushion and at least partially concealed by the outer surface.

7. A vehicle comprising:
   an audio device;
   a seat having a cushion;
   a hollow seat frame configured for supporting the cushion and defining a first internal air volume, wherein the hollow seat frame has a wall defining an air passageway, with the hollow seat frame being closed at one end by a closure feature; and
   a speaker assembly operable for converting an audio signal from the audio device into an audible sound wave, wherein the speaker assembly has an enclosure defining a second internal air volume;
   wherein the speaker assembly is operatively connected to the hollow seat frame adjacent to the end of the hollow seat frame that is closed, and wherein the second internal air volume is acoustically coupled to the first internal air volume through the air passageway to provide a continuous acoustic air volume.

8. The vehicle of claim 7, further comprising an acoustic sealing member disposed between the speaker assembly and the hollow seat frame and configured for acoustically sealing the air passageway.

9. The vehicle of claim 7, including a first speaker assembly and a second speaker assembly;
   wherein the first speaker assembly is acoustically coupled with a first portion of the hollow seat frame and the second speaker assembly is acoustically coupled with a second portion of the hollow seat frame, with the first speaker assembly and the first portion of the hollow seat frame being acoustically isolated from the second speaker assembly and the second portion of the hollow seat frame.

10. The vehicle of claim 7, wherein the closure feature is selected from the group consisting essentially of a crimp feature, a sealing device, and a plug feature.

11. A method for optimizing the acoustical performance of a speaker assembly used with a vehicle seat having a hollow frame portion, the method comprising:
   acoustically coupling an internal air volume defined by an enclosure of the speaker assembly to another internal air volume defined by the hollow frame portion of the vehicle seat through an air passageway defined by a wall of the hollow frame portion to thereby create a continuous acoustical air volume; and
   closing the ends of the hollow frame portion using a closure feature to thereby isolate a predetermined portion of the internal air volumes of the enclosure and the hollow frame portion.

12. The method of claim 11, further comprising:
   positioning an acoustical sealing gasket at least partially between the hollow frame portion and the speaker enclosure.

13. The method of claim 11, wherein closing the ends of the hollow frame using a closure feature includes using at least one of: a crimp feature, a sealing device, and a plug feature.

* * * * *